United States Patent
Cox

(10) Patent No.: US 11,421,397 B2
(45) Date of Patent: Aug. 23, 2022

(54) WEAR PLATE FOR A BLADE

(71) Applicant: Caterpillar Inc., Deerfield, IL (US)

(72) Inventor: David Cox, Monticello, IL (US)

(73) Assignee: Caterpillar Inc., Peoria, IL (US)

( * ) Notice: Subject to any disclaimer, the term of this patent is extended or adjusted under 35 U.S.C. 154(b) by 359 days.

(21) Appl. No.: 16/401,747

(22) Filed: May 2, 2019

(65) Prior Publication Data

US 2020/0347569 A1 Nov. 5, 2020

(51) Int. Cl.
*E02F 3/815* (2006.01)
*E01H 5/06* (2006.01)
*A01B 15/08* (2006.01)

(52) U.S. Cl.
CPC ............ *E02F 3/8152* (2013.01); *A01B 15/08* (2013.01); *E01H 5/061* (2013.01)

(58) Field of Classification Search
CPC ......... E01H 5/061; E01H 5/065; A01B 15/08; A01B 15/02; E02F 3/815; E02F 3/8152
See application file for complete search history.

(56) References Cited

U.S. PATENT DOCUMENTS

| | | | | |
|---|---|---|---|---|
| 787,660 A * | 4/1905 | Cahill | .................... | A01B 1/02 294/49 |
| 3,851,711 A * | 12/1974 | Stepe | .................... | E02F 3/8152 172/701.3 |
| 4,187,626 A * | 2/1980 | Greer | .................... | E02F 9/285 172/747 |
| 5,024,281 A * | 6/1991 | Furlough | ............... | A01B 3/462 172/219 |
| 5,078,217 A * | 1/1992 | Harrell | .................... | A01B 15/14 172/219 |
| 5,601,325 A * | 2/1997 | Sokaski | .................... | A01B 1/02 209/419 |
| D397,696 S * | 9/1998 | Grady | .......................... | D15/28 |
| 5,803,531 A * | 9/1998 | Nielsen | .................... | B60R 13/01 105/422 |
| 6,007,132 A * | 12/1999 | Burg | ........................ | B60R 13/01 296/39.1 |
| 6,129,409 A * | 10/2000 | D'Amico | ................ | B60R 13/01 296/183.2 |
| 6,869,524 B1 * | 3/2005 | Seidl | ........................ | E02B 8/026 210/159 |
| 6,874,260 B2 * | 4/2005 | Mullett | .................... | E01H 5/06 172/747 |
| 8,052,193 B2 * | 11/2011 | Liebert | .................... | B60R 13/01 296/39.1 |
| 10,066,371 B2 | 9/2018 | Winter | | |
| 10,113,297 B1 * | 10/2018 | Henning | ............... | E02F 3/8152 |

(Continued)

FOREIGN PATENT DOCUMENTS

CA 1243532 A 10/1988

OTHER PUBLICATIONS

Olofsfors AB., "SHARQ P300™—On Gravel", Jun. 18, 2014, 2 pages.

*Primary Examiner* — Jessica H Lutz
(74) *Attorney, Agent, or Firm* — Harrity & Harrity LLP

(57) ABSTRACT

A blade assembly is disclosed. The blade assembly may include a blade having a surface defined between an upper edge and a lower edge of the blade, the lower edge being associated with a cutting edge, and a wear plate attached to the blade. The wear plate may extend along the surface and terminate short of the lower edge. The wear plate may have a plurality of accumulation members.

20 Claims, 3 Drawing Sheets

(56) References Cited

U.S. PATENT DOCUMENTS

| | | | |
|---|---|---|---|
| 2005/0126056 A1* | 6/2005 | Kostecki | B60R 13/01 |
| | | | 37/379 |
| 2009/0101370 A1* | 4/2009 | Tasovski | E02F 3/8152 |
| | | | 172/1 |
| 2009/0311550 A1* | 12/2009 | Dietrich | E02F 9/2883 |
| | | | 428/599 |
| 2012/0267133 A1* | 10/2012 | Hill | E02F 3/7631 |
| | | | 172/701.1 |
| 2013/0052390 A1* | 2/2013 | Ruvang | E02F 3/401 |
| | | | 428/67 |
| 2017/0314236 A1* | 11/2017 | Long | E02F 3/40 |
| 2017/0355526 A1* | 12/2017 | Baric | B65G 11/16 |
| 2018/0010310 A1* | 1/2018 | Lakin | E01H 5/00 |
| 2018/0087246 A1* | 3/2018 | Pratt | E02F 9/2883 |
| 2019/0177954 A1* | 6/2019 | Congdon | B23K 33/00 |
| 2020/0325651 A1* | 10/2020 | Ono | E02F 3/3631 |

* cited by examiner

WEAR PLATE FOR A BLADE

TECHNICAL FIELD

The present disclosure relates generally to a wear plate and, more particularly, to a wear plate for a blade.

BACKGROUND

Earthmoving machines, such as graders, may be used to perform displacement, distribution, and leveling of material, such as soil. A grader typically employs a blade assembly that includes a blade and a cutting edge that is attached to the blade. As the grader moves along a surface of material, the cutting edge penetrates the surface to permit the blade assembly to displace and level the material. During grading operations, the blade assembly scrapes the surface and is also impacted by debris, such as soil, gravel, rock, and organic material (e.g., plant material), resulting in wear to the cutting edge and the blade. Accordingly, frequent replacement of the cutting edge or the blade may be necessary. Replacement of the cutting edge or the blade is difficult and time consuming, thereby negatively impacting efficiency and speed of grading operations.

One attempt at a cutting edge is disclosed in Canadian Patent No. 1,243,532 that issued to Sjoo on Oct. 25, 1988 ("the '532 patent"). In particular, the '532 patent discloses a cutting edge for a road planer that comprises holes for receiving fixation means arranged on a cutting edge support of the road planer for holding the cutting edge against the cutting edge support. The '532 patent indicates that the holes extend in a direction away from a lip of the cutting edge to enable a vertically variable adjustment of the cutting edge in relation to the cutting edge support. According to the '532 patent, material of the cutting edge is used in an efficient way so that an unused part of the cutting edge will be relatively small in relation to a worn portion.

While the cutting edge of the '532 patent is aimed at an efficient use of material of the cutting edge, the cutting edge of the '532 patent does not address wear to a blade of a blade assembly. During grading operations, both a cutting edge and a blade of a blade assembly may wear due to contact with a surface being graded and debris that impacts the blade assembly. Typically, a worn cutting edge that is rendered unusable can be replaced at a grading site (e.g., by one or more members of a grading crew). However, the blade is generally much larger and heavier than the cutting edge, thereby making replacement of the blade at the grading site impractical. Accordingly, a worn blade that is rendered unusable may significantly disrupt or delay grading operations.

The wear plate of the present disclosure can be used with a blade in order to solve one or more of the problems set forth above and/or other problems in the art.

SUMMARY

According to some implementations, the present disclosure is related to a blade assembly. The blade assembly may include a blade having a surface defined between an upper edge and a lower edge of the blade. The lower edge may be associated with a cutting edge. The blade assembly may include a wear plate attached to the blade. The wear plate may extend along the surface and terminate short of the lower edge. The wear plate may have a plurality of accumulation members.

According to some implementations, the present disclosure is related to a moldboard assembly. The moldboard assembly may include a moldboard having a surface. The surface may have an upper portion and a lower portion. The moldboard assembly may include a cutting edge attached to the moldboard. The cutting edge may cover the lower portion of the surface and the cutting edge may not cover the upper portion of the surface. The moldboard assembly may include a wear plate attached to the moldboard. The wear plate may cover a portion of the upper portion of the surface. The wear plate may have a plurality of openings.

According to some implementations, the present disclosure is related to a machine. The machine may include a frame and a blade having a surface defined between an upper edge and a lower edge of the blade. The lower edge of the blade may be associated with a cutting edge. The machine may include a wear plate. The wear plate may extend along the surface of the blade and terminate short of the lower edge of the blade. The wear plate may have a plurality of openings. The machine may include a mounting assembly that attaches the blade to the frame.

DETAILED DESCRIPTION

Figure 1:
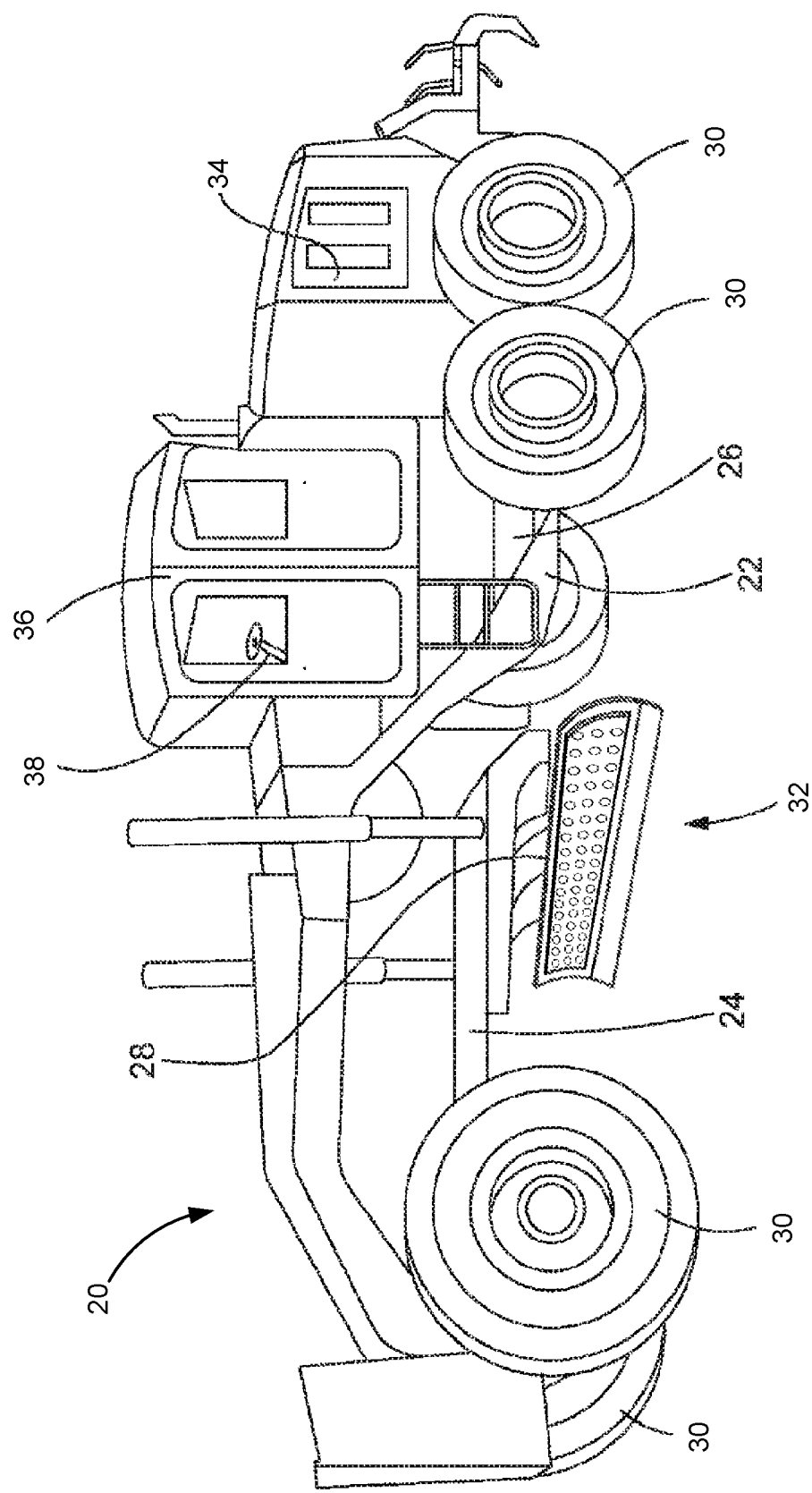
FIG. 1 is a diagram of an example machine that includes a blade assembly.

FIG. 1 is a diagram of an example machine 20 that includes a blade assembly 32. As shown in FIG. 1, machine 20 may embody a motor grader. However, in other embodiments, machine 20 may embody a loader, a plow, a dozer, an excavator, and/or the like.

Machine 20 may include a frame 22. Frame 22 may include a front frame 24 and a rear frame 26. Front frame 24 and rear frame 26 may be connected by an articulation joint (not shown) that permits front frame 24 to articulate relative to rear frame 26. Blade assembly 32 (e.g., a moldboard assembly) may be attached to frame 22 (e.g., to front frame 24 or to rear frame 26) by a mounting assembly 28. Mounting assembly 28 may be configured to support blade assembly 32 and to mount a blade (e.g., blade 40, as described below) of blade assembly 32 to frame 22. For example, mounting assembly 28 may include a first attachment member associated with blade assembly 32 that mates with, or otherwise attaches to, a second attachment member associated with frame 22.

Blade assembly 32 and/or mounting assembly 28 may be configured to move blade assembly 32 from an engaged position (e.g., a position in which blade assembly 32 is engaged with a surface being graded) to a disengaged position (e.g., a position in which blade assembly 32 is disengaged from the surface to permit travel by machine 20). In addition, blade assembly 32 and/or mounting assembly 28 may be configured to move blade assembly 32 in a plurality of positions suitable for grading a surface (e.g., a level position, a sloped position, an angled position, and/or the like).

Front frame 24 and rear frame 26 may be supported by wheels 30. Alternatively, front frame 24 and rear frame 26 may be supported by tracks, belts, and/or the like. Rear frame 26 may support an engine 34, or another power source, and an operator cab 36. An operator of machine 20 may control steering of machine 20 and/or a position of blade assembly 32 using an operator interface 38 located in operator cab 36.

As indicated above, FIG. 1 is provided as an example. Other examples may differ from what is described in connection with FIG. 1.

Figure 2:
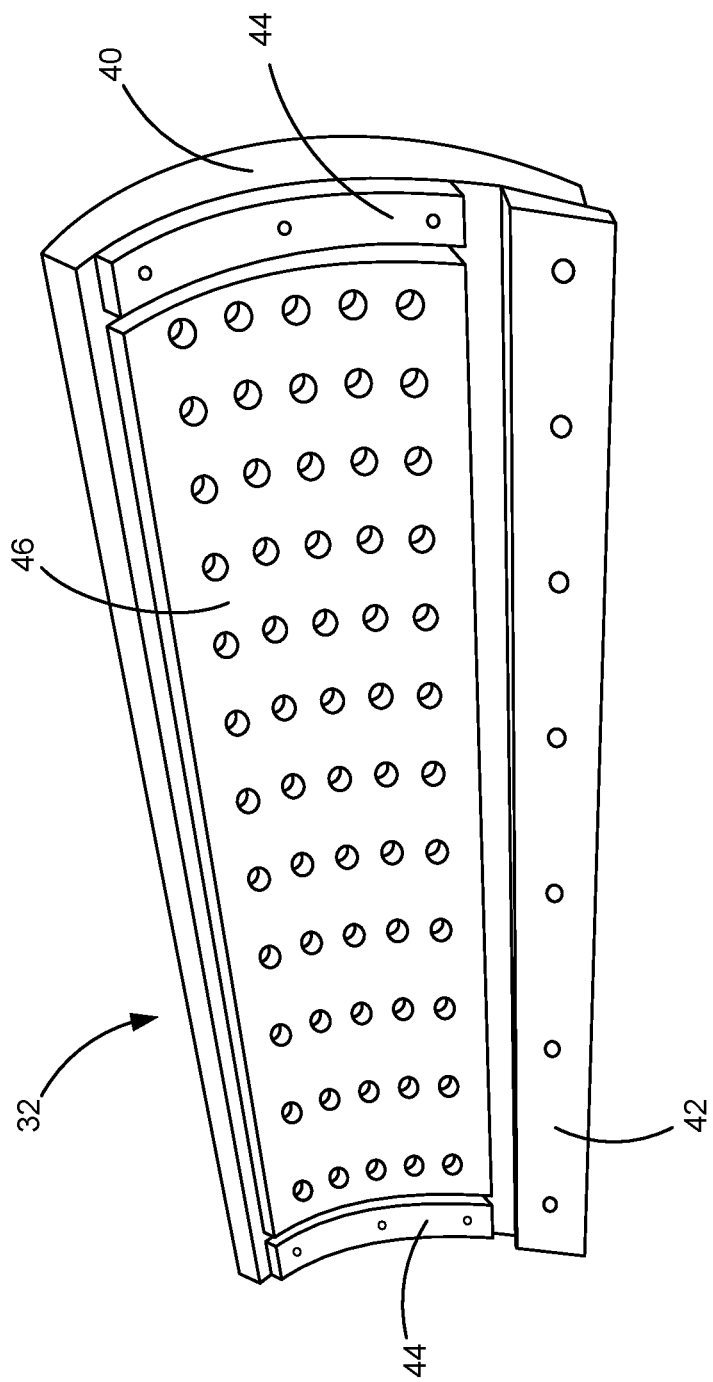
FIG. 2 is a diagram of an example blade assembly that may be used with the machine of FIG. 1.

FIG. 2 is a diagram of a perspective view of an example blade assembly 32 including a blade 40, a cutting edge 42, end bits 44, and a wear plate 46. As shown in FIG. 2, blade assembly 32 may embody a moldboard assembly including blade 40 (e.g., a moldboard), cutting edge 42, end bits 44, and wear plate 46. However, in other embodiments, blade assembly 32 may embody another implement, such as a bucket assembly that includes a bucket, a cutting edge, and a wear plate that are arranged in a manner similar to that described herein.

Blade 40 may be an elongated member having a width (e.g., a width parallel to a ground surface when blade 40 is in a level position on machine 20) greater than a height. Blade 40 may be curved (e.g., having an arc-shaped profile) along the width of blade 40. For example, blade 40 may be a moldboard (e.g., a moldboard included in a moldboard assembly) that is curved from an upper edge to a lower edge of the moldboard.

Blade 40 may have a working surface (e.g., a forward surface in a direction of travel of machine 20) defined between an upper edge and a lower edge of blade 40. The working surface may be curved along the width of blade 40. For example, the working surface may be a concave surface of blade 40 (e.g., a concave surface of a moldboard). An attachment member (e.g., an attachment member of mounting assembly 28, as described above) may be attached to blade 40 at a rear surface of blade 40 opposite the working surface of blade 40.

Blade 40 may be configured such that the lower edge of blade 40 is closer to a ground surface than the upper edge of blade 40 during a grading operation. The lower edge of blade 40 may be associated with a cutting edge (e.g., the lower edge of blade 40 may be a cutting edge or the lower edge of blade 40 may be configured for attachment of a cutting edge to blade 40).

In some implementations, blade assembly 32 may include cutting edge 42. Cutting edge 42 may be an elongated member having a width that is greater than a height. Cutting edge 42 may comprise multiple sections (e.g., multiple sections that have a combined width that is greater than the height). The width of cutting edge 42 may be equal to the width of blade 40 and the height of cutting edge 42 may be less than the height of blade 40.

Cutting edge 42 may be attached to blade 40 by one or more bolts, clips, and/or the like (e.g., to permit cutting edge 42 to be replaced). Alternatively, cutting edge 42 may be attached to blade 40 by welds.

Cutting edge 42 may be attached to the working surface of blade 40 (e.g., abutting the working surface) such that a portion of cutting edge 42 extends below the lower edge of blade 40. For example, cutting edge 42 may be attached to the working surface of blade 40 such that an upper edge of cutting edge 42 is between the upper edge and the lower edge of blade 40 and a lower edge of cutting edge 42 extends beyond the lower edge of blade 40. In some implementations, the working surface of blade 40 may be defined by an upper portion and a lower portion and cutting edge 42 may be attached to the working surface of blade 40 such that cutting edge 42 covers (e.g., abuts) the lower portion of the working surface and does not cover the upper portion of the working surface. That is, the lower portion of the working surface of blade 40 may be defined according to a portion of the working surface that is covered by cutting edge 42.

Blade assembly 32 may include end bits 44. End bits 44 may have a height that is equal to the height of blade 40. A surface of an end bit 44 may have a curvature that matches a curvature of the working surface of blade 40.

End bits 44 may be attached to blade 40 at lateral edges of blade 40. For example, a first end bit 44 may be attached to the working surface of blade 40 (e.g., abutting the working surface) at a first lateral edge of blade 40 and a second end bit 44 may be attached to the working surface of blade 40 (e.g., abutting the surface) at a second lateral edge of blade 40. Accordingly, an outward edge of an end bit 44 may align with a lateral edge of blade 40. Alternatively, the end bit 44 may be folded about the lateral edge of blade 40, such that the end bit 44 contacts (e.g., abuts) the working surface of blade 40 and the rear surface of blade 40.

End bits 44 may be attached to blade 40 by one or more bolts, clips, and/or the like (e.g., to permit end bits 44 to be replaced). Alternatively, end bits 44 may be attached to blade 40 by welds.

Cutting edge 42 and end bits 44, when attached to blade 40, may define an uncovered area (e.g., an exposed area) of blade 40 that is susceptible to wear. Accordingly, blade assembly 32 may include wear plate 46. Wear plate 46 may be attached to blade 40 (e.g., so as to cover a portion of the uncovered area). Wear plate 46 may be attached to blade 40 by welds (e.g., wear plate 46 may be welded to the working surface of blade 40). Alternatively, wear plate 46 may be attached to blade 40 by one or more bolts, clips, and/or the like (e.g., to permit wear plate 46 to be replaced). In some implementations, wear plate 46 may be attached to blade 40 by bolts affixed through one or more of a plurality of openings in wear plate 46, as described below.

Wear plate 46 may extend along the working surface of blade 40 and terminate short of the lower edge of blade 40 (e.g., so as not to extend beyond the lower edge of blade 40). For example, wear plate 46 may extend along the working surface of blade 40 from the upper edge of blade 40 (e.g., an upper edge of wear plate 46 may align with the upper edge of blade 40) to the upper edge of cutting edge 42 and between inward edges of end bits 44. Wear plate 46 may abut the upper edge of cutting edge 42 and/or the inward edges of end bits 44. Alternatively, wear plate 46 may be attached to blade 40 so as to maintain a gap (e.g., a gap of about 0.25 inches, 0.5 inches, 1 inch, and/or the like) between wear plate 46 and cutting edge 42 and/or end bits 44. Accordingly, wear plate 46 may not overlap with cutting edge 42.

In some implementations, the working surface of blade 40 may be defined by an upper half and a lower half, and wear plate 46 may be attached to the working surface of blade 40 such that wear plate 46 covers (e.g., abuts) a portion of the upper half. The upper half and the lower half may be symmetrical (e.g., symmetrical about a horizontal line of symmetry of the working surface). Additionally, or alternatively, the upper half may include a first area (e.g., above a center line of the working surface), the lower half may include a second area (e.g., below the center line of the working surface), and the first area may be equal to the second area.

As indicated above, FIG. 2 is provided as an example. Other examples may differ from what is described in connection with FIG. 2.

Figure 3:
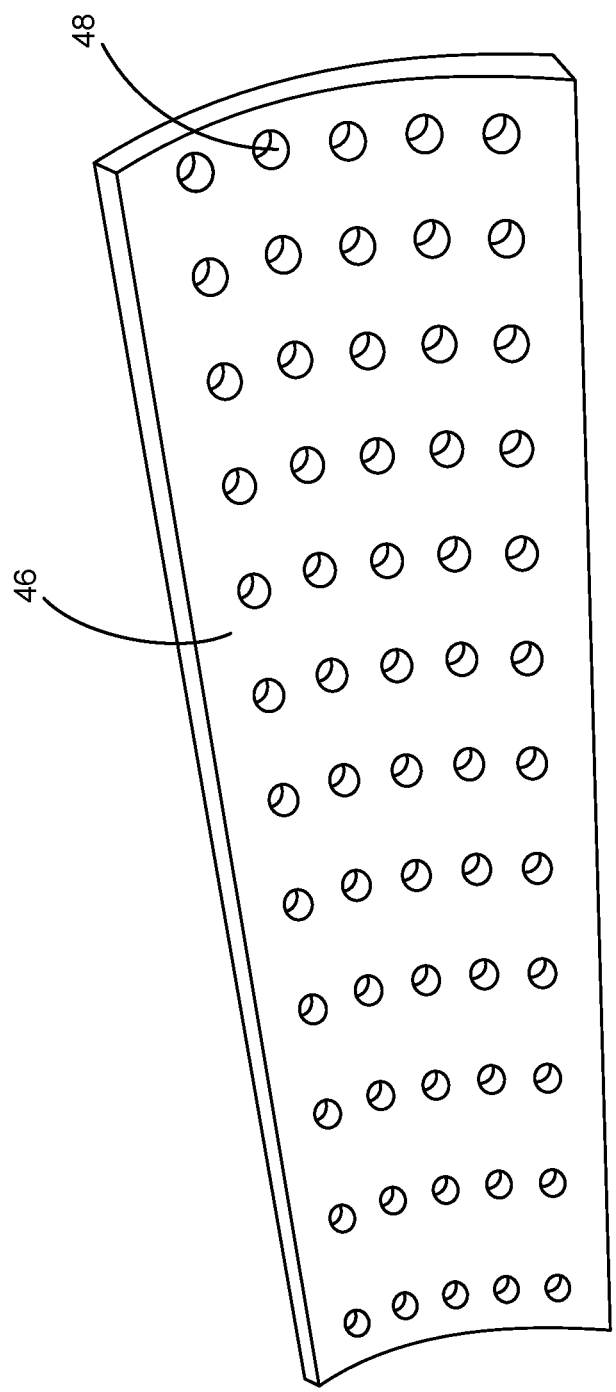
FIG. 3 is a diagram of an example wear plate that may be used with the blade assembly of FIG. 2.

FIG. 3 is a diagram of a perspective view of an example wear plate 46. Wear plate 46 may be an elongated member having a width greater than a height. Wear plate 46 may comprise multiple sections (e.g., multiple sections that have a combined width greater than the height). The width of wear plate 46 may be less than the width of blade 40 and the height of wear plate 46 may be less than the height of blade 40.

Wear plate 46 may be curved (e.g., having an arc-shaped profile) along the width of wear plate 46. For example, wear plate 46 may be curved from an upper edge to a lower edge of wear plate 46. In some implementations, a surface (e.g., a rear surface) of wear plate 46 may have a curvature that matches a curvature of the working surface of blade 40.

Wear plate 46 may include a plurality of accumulation members 48. The plurality of accumulation members 48 may be configured to accumulate debris (e.g., soil, gravel, rock, and/or organic material that contacts wear plate 46 during a grading operation). The plurality of accumulation members 48 may be arranged in a grid of rows and columns, may be randomly distributed across wear plate 46, or may be distributed to areas of wear plate 46 that correspond to areas of blade 40 that experience wear during grading operations.

The plurality of accumulation members 48 may include a plurality of openings. An opening may be a hole (e.g., extending from a first surface to a second surface of wear plate 46) or a recess (e.g., extending from the first surface toward the second surface of wear plate 46). The plurality of openings may include a combination of holes and recesses. The plurality of openings may be circular, rectangular, triangular, polygonal, and/or the like.

The plurality of accumulation members 48 may include one or more grooves (e.g., one or more sinuous grooves and/or one or more intersecting grooves (e.g., in a criss-crossing pattern)). A groove may extend from the first surface to the second surface of wear plate 46 or may extend from the first surface toward the second surface of wear plate 46. The plurality of accumulation members 48 may include a combination of one or more openings and one or more grooves.

Wear plate 46 may be formed by punching, drilling, laser cutting, water cutting, heat cutting, and/or the like a plurality of openings and/or grooves into a flat plate, and bending the flat plate (e.g., using a bending machine, such as a hydraulic bending machine) into a curved plate. Wear plate 46 may be composed of steel (e.g., mild steel, strengthened steel, high carbon steel, and/or the like). In some implementations, wear plate 46 is composed of a first type of material (e.g., mild steel) and cutting edge 42 is composed of a second type of material (e.g., strengthened steel).

As indicated above, FIG. 3 is provided as an example. Other examples may differ from what is described in connection with FIG. 3.

INDUSTRIAL APPLICABILITY

The disclosed wear plate 46 may be used with any blade 40 where reducing wear caused by impacts of debris is desired, such as a blade 40 used with a grader, a plow, a dozer, and/or the like.

In operation, the plurality of accumulation members 48 accumulate debris (e.g., soil, gravel, rock, organic material, and/or the like) during a grading operation. For example, during the grading operation, as debris impacts wear plate 46, a portion of the debris adheres, or otherwise maintains contact (e.g., by friction), to wear plate 46 as a result of the plurality of accumulation members 48. Over time (e.g., after one or more grading operations), a layer of debris forms on wear plate 46. In this way, debris that would otherwise impact wear plate 46 during a grading operation instead impacts the layer of debris that formed on wear plate 46. As a result, wear to wear plate 46 is reduced, thereby reducing damage to wear plate 46 and improving a usable life of wear plate 46. Accordingly, wear plate 46 provides improved protection against wear to blade 40.

What is claimed is:

1. A blade assembly, comprising:
a blade having a surface defined between an upper edge and a lower edge of the blade,
the lower edge being associated with a single cutting edge, and
a width of the single cutting edge being equal to a width of the blade;
a single wear plate attached to the blade,
the single wear plate extending, along the surface, from the upper edge and terminating short of the lower edge,
the single wear plate having a plurality of accumulation members including openings in the wear plate,
a dimension of each opening, of the openings, being less than a distance to each other opening,
a curvature of the single wear plate matching a curvature of the surface of the blade;
a first end bit attached to a first lateral edge of the blade,
a width of the first end bit being less than a width of the single wear plate,
the first end bit being provided without accumulation members,
a curvature of a surface of the first end bit matching the curvature of the surface of the blade, and
the first end bit being different than the single wear plate; and
a second end bit attached to a second lateral edge of the blade,
a width of the second end bit being less than the width of the single wear plate,
the second end bit being provided without accumulation members,
a curvature of a surface of the second end bit matching the curvature of the surface of the blade, and
the second end bit being different than the single wear plate.

2. The blade assembly of claim 1, wherein the plurality of accumulation members include a plurality of grooves.

3. The blade assembly of claim 1, wherein the plurality of accumulation members include at least one of a plurality of sinuous grooves or a plurality of intersecting grooves.

4. The blade assembly of claim 1, wherein the plurality of accumulation members are configured to accumulate debris.

5. The blade assembly of claim 1, wherein the blade is a moldboard.

6. The blade assembly of claim 1, wherein the single wear plate is welded to the blade.

7. The blade assembly of claim 1, wherein the surface of the blade has an upper half and a lower half, and
wherein the single wear plate covers a portion of the upper half.

8. A moldboard assembly, comprising:
a moldboard having a surface,
the surface having an upper portion and a lower portion;
a cutting edge attached to the moldboard,
the cutting edge covering the lower portion of the surface and the cutting edge not covering the upper portion of the surface;

a single wear plate attached to the moldboard,
   the single wear plate covering a portion of the upper portion of the surface,
   the single wear plate having a plurality of openings, and
   the single wear plate terminating short of an upper edge of the cutting edge;
a first end bit without openings,
   a height of the first end bit being approximately equal to a height of the single wear plate,
   a width of the first end bit being less than a width of the single wear plate, and
   a curvature of a surface of the first end bit matching a curvature of a surface of the single wear plate; and
a second end bit without openings,
   a height of the second end bit being approximately equal to the height of the single wear plate,
   a width of the second end bit being less than the width of the single wear plate, and
   a curvature of a surface of the second end bit matching the curvature of the surface of the single wear plate.

9. The moldboard assembly of claim 8, wherein the surface is a concave surface of the moldboard.

10. The moldboard assembly of claim 8, wherein the surface of the moldboard has a curvature that corresponds to the curvature of the single wear plate.

11. The moldboard assembly of claim 8, wherein the single wear plate is curved from an upper edge of the single wear plate to a lower edge of the single wear plate.

12. The moldboard assembly of claim 8, wherein the cutting edge and the single wear plate do not overlap.

13. The moldboard assembly of claim 8, wherein one or more openings, of the plurality of openings, expose the surface of the moldboard.

14. The moldboard assembly of claim 8, wherein the surface of the moldboard has an upper half and a lower half, and
   wherein the portion of the upper portion that is covered by the single wear plate includes an area of the upper half.

15. A machine, comprising:
a frame;
a blade having a surface defined between an upper edge and a lower edge of the blade,
   the lower edge of the blade being associated with a cutting edge;
a single wear plate,
   the single wear plate extending, along the surface of the blade and terminating short of the lower edge of the blade,
   the single wear plate having a plurality of openings;
a first end bit attached to a first lateral edge of the blade,
   a curvature of a surface of the first end bit matching a curvature of the surface of the blade,
   a width of the first end bit being less than a width of the single wear plate, and
   the first end bit being provided without openings;
a second end bit attached to a second lateral edge of the blade,
   a curvature of a surface of the second end bit matching the curvature of the surface of the blade,
   a width of the second end bit being less than the width of the single wear plate,
   the second end bit being provided without openings; and
a mounting assembly that attaches the blade to the frame.

16. The machine of claim 15, wherein the machine is a grader.

17. The machine of claim 15, wherein the single wear plate extends along the surface of the blade starting from the upper edge.

18. The machine of claim 15, wherein the plurality of openings are arranged in a grid.

19. The machine of claim 15, wherein the single wear plate further has a plurality of grooves.

20. The machine of claim 15, wherein the single wear plate is welded to the blade.

* * * * *